United States Patent [19]

Vasseur

[11] Patent Number: 5,626,042
[45] Date of Patent: May 6, 1997

[54] DEVICE FOR THE PREPARATION OF USED METAL BARRELS WITH A VIEW TO FACILITATING HANDLING AND RECYCLING THEREOF

[76] Inventor: Jean-Claude Vasseur, 42, Avenue de Conflans, 78260 Acheres, France

[21] Appl. No.: 439,889

[22] Filed: May 12, 1995

[51] Int. Cl.$^6$ .................................................. B21C 43/00
[52] U.S. Cl. .......................... 72/39; 72/325; 100/902; 134/22.18; 134/22.12; 134/21; 134/48; 134/85
[58] Field of Search ..................... 72/39, 40, 325; 100/902; 134/22.18, 22.12, 21, 167 R, 172, 166 R, 48, 85

[56] References Cited

U.S. PATENT DOCUMENTS

| | | | |
|---|---|---|---|
| 2,896,643 | 7/1959 | Ottoson | 134/21 |
| 3,993,221 | 11/1976 | Boynton et al. | 100/98 R |
| 4,140,543 | 2/1979 | Soleri | 134/22.18 |
| 4,628,972 | 12/1986 | LaRochelle | 134/133 |
| 5,409,545 | 4/1995 | Levey | 134/22.18 |
| 5,463,887 | 11/1995 | Vasseur | 72/39 |

FOREIGN PATENT DOCUMENTS

| | | | |
|---|---|---|---|
| 951870 | 11/1949 | France | 134/85 |
| 2082540 | 3/1982 | United Kingdom . | |

*Primary Examiner*—Daniel C. Crane
*Attorney, Agent, or Firm*—Browdy and Neimark

[57] ABSTRACT

A device for the processing of a barrel of which the upper side comprises a filling hole situated in a standardized position, this device comprising a processing enclosure fitted with a supporting structure bearing a rotary annular part on which the barrel can be disposed, centered and pivoted about its vertical axis of symmetry, and with a purging device comprising a purging rod that is vertically translatable, this rod being disposed to come into line with the axis of the hole subsequent to a rotation of the barrel and to then be inserted inside the barrel by translational motion.

11 Claims, 1 Drawing Sheet

DEVICE FOR THE PREPARATION OF USED METAL BARRELS WITH A VIEW TO FACILITATING HANDLING AND RECYCLING THEREOF

BACKGROUND OF THE INVENTION

1. Field of the Invention

This invention relates to a device for the processing of used barrels with a view to storage and/or recycling thereof.

2. Description of the Prior Art

It relates notably, though not exclusively, to a device for the compressing of metal barrels, of the type described in French patent No. 93 00753 (publication number 2 700 495) granted to SFANID RENOV'CUVES, and which uses:
- an enclosure forming the supporting structure of the press and intended to receive the barrel to be processed,
- a dual-action hydraulic jack of which the body is mounted on the upper side of the enclosure and whose rod, which passes through said side, bears at its lower end a crushing plate that is vertically mobile inside the enclosure,
- a base situated opposite the plate and on which the barrel is positioned,
- a perforating and cleaning mechanism comprised of a cylindrical tube mounted vertically slidable through an opening in the plate and ended, at its lower part, by a perforating head,
- a vertical gantry mounted fixedly on the plate, supporting the perforating and cleaning mechanism by means of a jack.

Initially, the crushing plate is in the upper position which is the position in which a plate can be placed on the base.

Once this latter operation has been performed, the plate is lowered slightly to come to bear on the upper side of the barrel.

The next stage consists in lowering the perforating and cleaning mechanism to the lower position by means of the jack so as to successively bore the upper side and then the lower side of the barrel, after which the device conducts a phase, consisting in raising the perforating and cleaning mechanism, during which the barrel is washed by the injection of pressurized cleansing fluid which flows out through the hole made in the lower side of the barrel.

Once the perforating mechanism has been raised to the upper position, the plate is lowered to crush the barrel and reduce it to the dimensions of a thin cake.

When the plate has been raised, this cake can be removed and be easily transported e.g. to a recycling center.

It so happens that devices of this type, despite the fact that they enable excellent results to be obtained and are particularly efficient in solving the environmental problem posed by the storage of used barrels having contained pollutant or even dangerous products, nonetheless pose certain problems.

A first problem is related to the fact that a certain number of barrels to be processed have contained or even continue to contain volatile inflammable products generating an explosive atmosphere inside the barrel. In view of this fact, and despite the use of explosion-proof substances, notably at the level of the perforating mechanism, the risk of explosion cannot really be entirely excluded.

In order to obviate these drawbacks, it has been proposed that the barrels be purged prior to the perforating phase. However, this purging implies manipulations that have proved to be dangerous due to the harmfulness of the products contained in the barrels.

A second problem is related to the fact that the putting of the barrels into position and the removal of the cakes imply manipulations within the enclosure of the device. Here again, such manipulations must be totally excluded when the barrels have contained or contain toxic products.

OBJECT OF THE INVENTION

The main object of this invention is to provide a solution to solve these problems, particularly by performing an automatic purge inside the enclosure, without requiring any manipulations inside the latter.

To this end, the invention is based on the fact that the filling or draining hole on the upper side of the barrel is disposed in a standardized position on said side. (In fact, it is centered on a coaxial circle of predetermined radius).

SUMMARY OF THE INVENTION

Accordingly, there is provided a device for processing barrels comprising a processing enclosure fitted with a supporting device equipped with a rotary supporting means on which the barrels can be disposed, centered and pivoted about their vertical axis of symmetry, and a purging device comprising a purging rod that is mobile along a vertical axis situated at a same distance from said axis of symmetry as the orifice on the upper side of the barrel, in order to be able to bring said orifice into line with the axis of said rod by a simple rotation of the barrel and to insert the rod into the barrel by a simple translation of said rod.

In order to carry out loading and unloading of the processing enclosure as well as centering and orientation of the barrel, without having to perform any manipulation inside the enclosure, the device supporting the barrels can be designed to be translationally mobile so as to take up two positions, namely:
- a loading/unloading position situated outside of the enclosure, this position enabling the barrel to be centered and orientated prior to the loading, as well as enabling it to be unloaded subsequent to the processing, and
- a processing position situated inside the enclosure, this position enabling the enclosure to be tightly sealed and the purging and processing operations to be performed.

BRIEF DESCRIPTION OF THE DRAWINGS

Further features and advantages of the invention will be apparent from the embodiment of the invention described, by way of a non-limiting example, in reference to the corresponding accompanying drawings in which.

DESCRIPTION OF THE PREFERRED EMBODIMENTS

Figure 1:
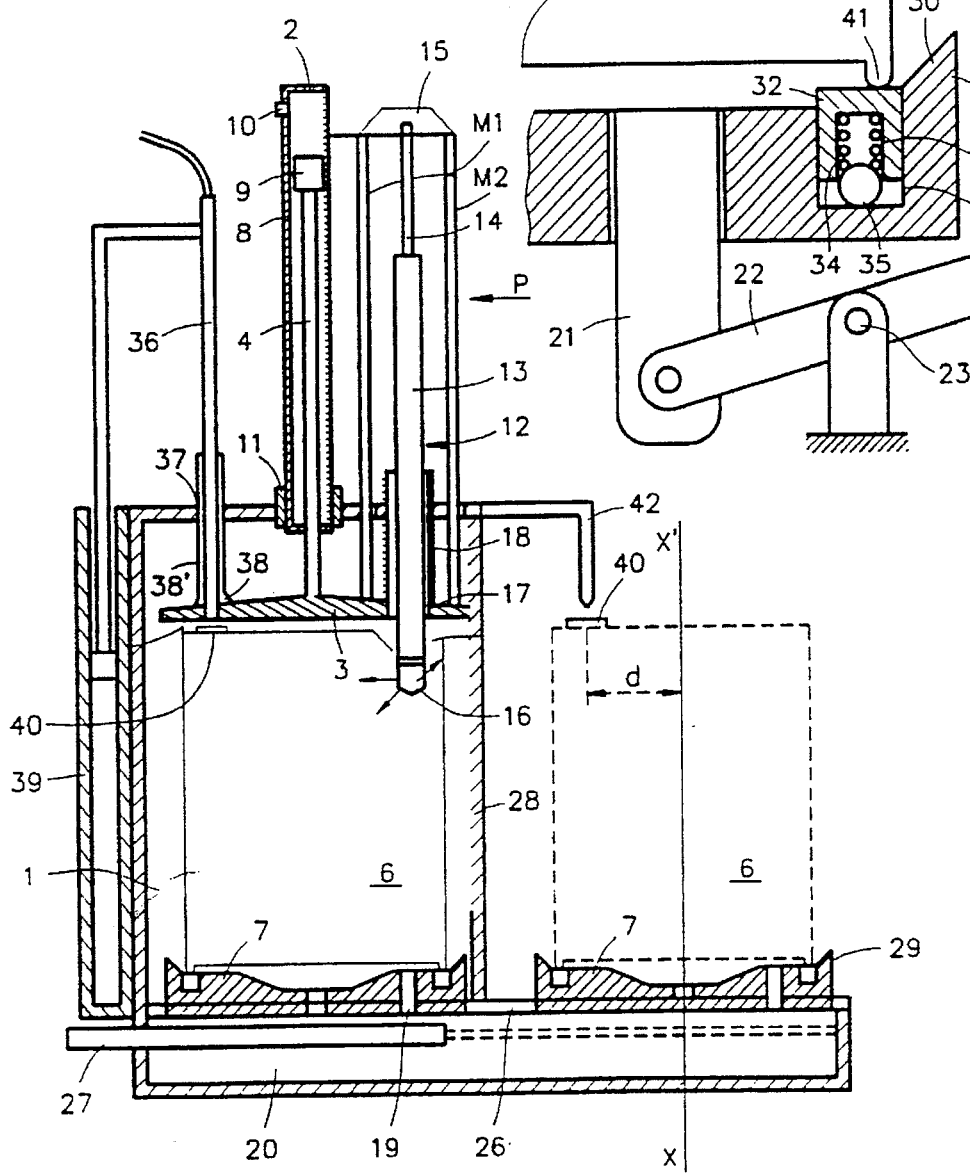
FIG. 1 schematically represents a vertical section of a device of the type of the one disclosed in the above-mentioned patent application, adapted according to the invention.

In FIG. 1, the device for cleaning and crushing the metal barrels firstly uses a hydraulic press comprising:
- an enclosure 1 forming the supporting structure of the press and intended to receive the barrel 6 to be processed,
- a dual-action hydraulic jack 2 comprising a cylinder body 8 inside which slides a piston 9 integral with a rod 4 and which delimits two working chambers into which a pressurized hydraulic fluid can be injected via orifices 10, 11,
- a crushing plate 3 that is vertically mobile inside the enclosure 1 and activated by the rod 4 of the jack 2, and

- a base 7 situated opposite the plate 3 and on which the barrel 6 is positioned.

This device also comprises a perforating and cleaning mechanism 12 comprised of a cylindrical tube 13 mounted vertically slidable through an opening 17 in the plate 3, by means of a cylindrical guide sleeve 18 integral with said plate 3.

The tube 13 is extended at its lower part by a cylindro-conical perforating head 16 of which the cylindrical part, substantially of the same diameter as the tube 13, bears a coaxial shaft mounted rotational inside the tube 13 and whose conical part, oriented downwards, is fitted with radially protruding ribs extending along the generators of the cone.

It further encloses, coaxially, a dual-action hydraulic jack of which the rod 14, which exits via the upper opening in the tube 13, is attached to the cross-piece 15 of an inverted U-shaped gantry whose legs are attached to the plate 3.

In this example, the cylinder body 8, like the cylindrical tube 13 and the two vertical posts M1, M2 of the gantry P, are mounted slidable through the upper side of the enclosure 1 by means of appropriate openings.

The base 7 of the press comprises a circular opening 19 situated coaxially with the tube 13 opening out into a retention vat 20 for the residual cleansing fluids.

Figure 2:
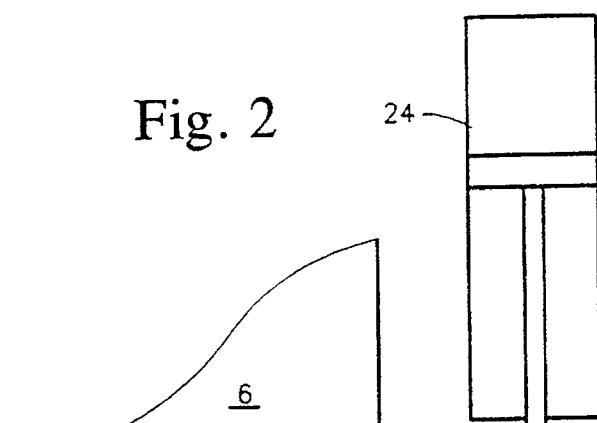
FIG. 2 is a partial axial section showing the peripheral edge of the supporting structure fitted with the barrel centering and orienting means.

This opening 19 also serves for the passage of a burring element 21 attached to one end of a lever 22 mounted tilting about a horizontal axis 23 and which is activated by a hydraulic jack 24 of which the rod 25 is integral with the other end of the lever 22. This burring element is shown schematically in FIG. 2.

According to the invention, the base 7 is translationally mobile along a guide means 26 so as to be able to move between a working position situated inside the enclosure 1 (position indicated in full lines) and a loading/unloading position situated outside (position indicated in broken lines).

The base 7 is activated by means of a dual-action hydraulic jack 27 situated at the level of the vat 20.

The passage of the base 7, supporting the barrel 6 as the case may be, from the inside to the outside of the enclosure and, vice versa, is performed by means of an opening fitted with a door 28 that can be automatically operated so that, in the working position of the base 7, the door will be tightly sealed. In this way, the barrel 6 can be processed without any risk for the operator situated outside.

In this example, the base 7 is made of a single parallelepiped-shaped massive part of which the two horizontal sides are substantially square.

The upper side comprising a circular ribbing 29 of which the conical inner side 30 ends at a circular groove 31 of rectangular cross-section.

This groove 31 houses an annular part 32 fitted with plural axial cavities 33 each housing a compression spring 34 and a ball 35 intended to roll on the bottom of the groove 31. In the idle position (even when it supports a barrel 6), the annular part 32 borne by the springs 34/ball 35 assembly is slightly raised in relation to the upper side of the base 7. Conversely, in the working position, when the plate of the press activated by the jack 2 crushes the barrel 6, the annular part 32 completely embeds itself in the groove 31 and becomes flush with the upper side of the base 7. In this position, it bears directly on the bottom of the groove 31. By way of this arrangement, all possibilities of deterioration of the barrel orienting means are avoided, especially deterioration of the springs 34 and balls 35 due to intense strains brought to bear by the press in order to crush the barrel 6.

Furthermore, the barrel processing device represented in FIG. 1 comprises a barrel purging means intended for use during the phase preceding the barrel perforating phase, in order to avoid all risks of explosion.

This purging means comprises a vertical purging rod 36 passing through the upper side of the enclosure 1 by means of a first opening 37 and through the plate 3 of the press by means of a second opening 38. The rod is then guided by a tubular sleeve 38' that is integral with the plate 3 of the press and that can enter the bore 37 when the plate 3 is in the upper position.

This rod 36, which is translationally mobile along its vertical axis, is operated by a dual-action jack 39 disposed against a lateral side of the enclosure 1.

The vertical axis of the rod 36 is placed at a distance d from the vertical axis of the base 7 (when the latter is in the working position) equal to the distance included between the axis XX' of a barrel 6 and the filling or draining hole 40 situated on the upper side. It ensures that, if the barrel 6 is correctly oriented on the base 7, the rod 36 operated by the jack 39 will be able to enter the barrel 6 via the opening 40 and carry out a purging of the barrel.

The rod 36 can, of course, be connected to a suction means of a conventional type. It can also include a Venturi type suction system operated by means of pressurized gas.

The device described above is operated as follows:

In order to process a barrel 6, the operator firstly commands the passage of the base 7 to the loading/removal position. This command causes the jack 27 to move into the deployed state, thereby causing the base 7 to translate. At the same time, the door 28 of the enclosure 1 is moved to the open position in order to enable the base 7 to pass.

By means of a fork lift truck, the operator then deposits the barrel 6 on the upper side of the base 7. The centering of the barrel 6 is then ensured automatically by means of the conical side 30 of the circular rib 29. Once it has been centered, the barrel 6 rests, via its seaming 41, on the annular part 32 and can therefore pivot about its vertical axis. The operator then adjusts the orientation of the barrel 6 by pivoting it until the filling hole 40 is situated at the level of an index 42 suitably disposed in correspondence with the position of the rod 36 (this index is situated at a distance d from the axis XX' of the base when the latter is in the loading/removal position).

Once this operation has been completed, the operator commands the moving of the base 7/barrel 6 assembly into the working position and the closing of the door 28 (which may be performed automatically).

In the working position, the filling hole 40, from which the stopper will have been removed beforehand, is situated in line with the axis of the purging rod 36.

The jack 39 then commands the lowering of the rod 36 inside the barrel 6, while the suction means is started up so as to aspirate the liquid and/or gaseous contents of the barrel and to ensure replacement thereof by a neutral gas or air.

When the purging operation has been performed, the jack 39 commands the raising of the rod 36. The device can then launch a barrel 6 washing and crushing sequence successively comprising:

- a slight lowering of the plate 3 of the press so as to firmly block the barrel 6 on its base 7,
- the lowering of the perforating and cleaning means 12 in order to successively pierce the upper and then the lower side of the barrel 6 until the head 16 of the mechanism 12 enters the opening 19,
- the raising of the perforating and cleaning means 12 with injection by the head 16 of a cleansing fluid (the raising speed and the pressure of the cleansing fluid can be adjusted as a function of the degree of contamination of the barrel 6),

- the lowering of the plate 3 of the press in order to crush the barrel 6 and reduce it to the dimensions of a thin cake,
- the burring of the opening made in the lower side of the barrel, by activating the burring element 21 by means of the jack 24,
- the raising of the press plate 3,
- the opening of the door 28 and the moving of the base 7 from the working position to the loading/removal position,
- the removal of the cake and transfer thereof on a transportation vehicle.

The fluids recuperated in the retention vat 20 can, of course, be pumped with a view to storage thereof and/or processing at a later stage in a specialized processing unit.

The invention is not, of course, limited to the embodiment described above.

Thus, according to another embodiment, the jack activating the press plate 3 and the jack of the perforating and cleaning means 12 can be arranged coaxially.

According to another embodiment, the purging rod 36 could incorporate the perforating and cleaning mechanism 12. Of course, in this case, the perforating mechanism will only have to perforate the lower part of the barrel. It is evident that this solution is only made possible by the barrel centering and orienting means.

According to yet another embodiment, the orienting of the barrel 6 can be carried out automatically by a means rotating the barrel commanded by a means for detecting and, possibly, for unplugging the filling hole of the barrel, disposed in replacement of the index 42.

I claim:

1. A device for processing a used barrel with a view to storage and/or recycling thereof, said barrel having a vertical axis of symmetry and comprising an upper side fitted with a filling and/or draining hole having a vertical axis spaced from said axis of symmetry and situated in a standardized position, said device comprising:

a processing enclosure inside which said barrel is processed, a supporting structure comprising a base bearing a rotary supporting means on which said barrel is disposed, centered and pivoted about said vertical axis of symmetry, and a purging device comprising a purging rod that is mobile along a vertical axis situated at a same distance from said axis of symmetry as the axis of said hole, in order for said rod to be able to be brought into line with the axis of said hole when said barrel is disposed in said enclosure and centered on said rotary supporting means, by means of a simple rotation of said barrel on said rotary supporting means, and to then be inserted inside the barrel by a downward translational motion along said vertical axis, said rod being connected to a suction means.

2. The device as claimed in claim 1, wherein the barrel supporting structure comprises translation means for translating said base with said barrel disposed thereon between two positions, namely:

a loading/unloading position situated outside of the enclosure, said position enabling the barrel to be centered and oriented and unloaded subsequent to the processing, and a processing position situated inside said enclosure which is tightly sealed, this position enabling said barrel disposed on said base to be purged and processed.

3. The device as claimed in claim 2, comprising a means enabling said hole to be brought into line with the axis of said rod, said means using a means for marking the filling hole when said base supporting said barrel is in said loading/unloading position.

4. The device as claimed in claim 3, wherein said marking means consists of an index.

5. The device as claimed in claim 3, wherein said means enabling said hole to be brought into line with said rod comprises a barrel rotating means commanded by means for detecting said filling hole of said barrel.

6. The device as claimed in claim 1, wherein said purging rod comprises a Venturi type suction means supplied with pressurized gas.

7. The device as claimed in claim 1, wherein said base has an upper side bearing said barrel and comprising a circular ribbing having an inner conical side for centering said barrel.

8. A device for processing a used metal barrel with a view to storage and/or recycling thereof, said barrel having a vertical axis of symmetry and comprising an upper side fitted with a filling and/or draining hole having a vertical axis spaced from said axis of symmetry and situated in a standardized position, said device comprising:

a supporting structure comprising a base bearing a rotary supporting means on which said barrel is disposed, centered and pivoted about said vertical axis of symmetry, a purging device comprising a purging rod that is mobile along a vertical axis situated at a same distance from said axis of symmetry as the axis of said hole, in order for said rod to be able to be brought into line with the axis of said hole when said barrel is disposed and centered on said rotary supporting means, by means of a simple rotation of said barrel on said rotary supporting means, and to then be inserted inside the barrel by translational downward motion along said vertical axis, a crushing plate for crushing said barrel against said base, said plate being parallel to said base and vertically mobile under the action of a first dual-action hydraulic jack, and a perforating and cleaning mechanism for cleaning said barrel, said mechanism comprising a cylindrical tube mounted vertically slidable through an opening in the plate and operated by a second dual-action hydraulic jack.

9. The device as claimed in claim 8, wherein said first jack and said second jack are arranged coaxially.

10. The device as claimed in claim 8, wherein said purging rod incorporates said perforating and cleaning mechanism.

11. A device for processing a used barrel with a view to storage and/or recycling thereof, said barrel having a vertical axis of symmetry and comprising an upper side fitted with a filling and/or draining hole having a vertical axis spaced from said axis of symmetry and situated in a standardized position, said device comprising:

a supporting structure comprising a base bearing a rotary supporting means on which said barrel is disposed, centered and pivoted about said vertical axis of symmetry, said supporting means comprising a circular groove of rectangular cross-section housing an annular bearing member for bearing said barrel which is centered thereon, said bearing member being fitted with plural axial cavities each housing a compression spring and a ball intended to roll on the bottom of said groove, and a purging device comprising a purging rod that is mobile along a vertical axis situated at a same distance from said axis of symmetry as the axis of said hole, in order for said rod to be able to be brought into line with the axis of said hole when said barrel is disposed and centered on said rotary supporting means, by means of a simple rotation of said barrel on said rotary supporting means, and to then be inserted inside the barrel by translational downward motion along said vertical axis.

* * * * *